W. P. & S. G. THOMSON.
RAIL JOINT.
APPLICATION FILED OCT. 4, 1907.
969,124.
Patented Aug. 30, 1910.
6 SHEETS—SHEET 1.
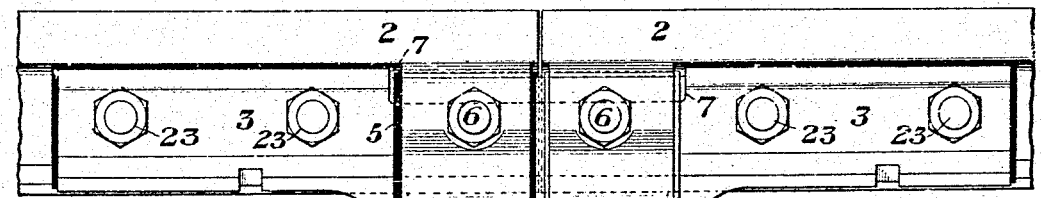
Fig. 1.
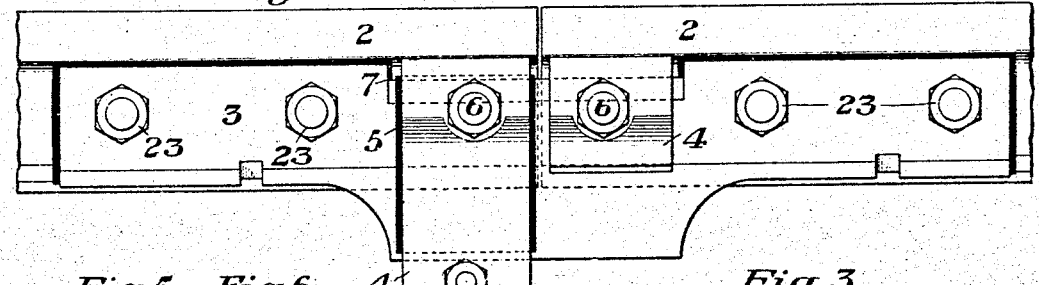
Fig. 2.    Fig. 5. Fig. 6.    Fig. 3.
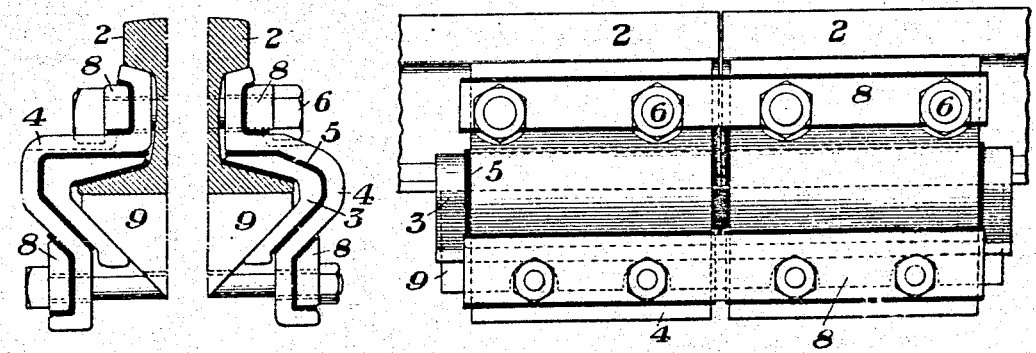
Fig. 4.
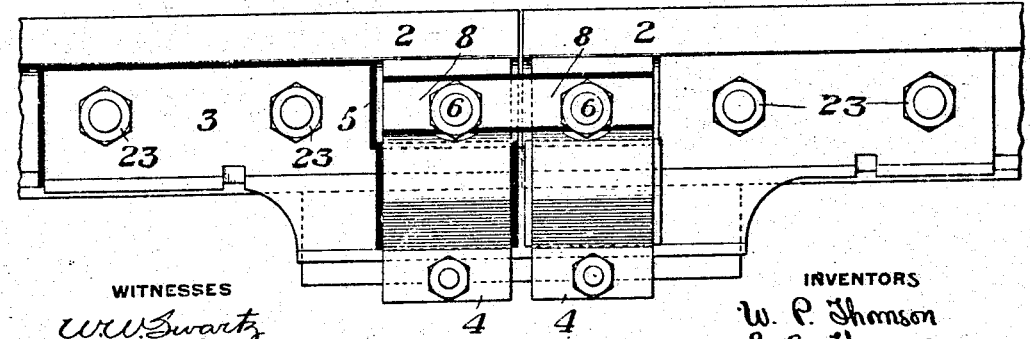
WITNESSES
W. W. Swartz
H. M. Cohen
INVENTORS
W. P. Thomson
S. G. Thomson
by Bakewell, Byrnes & Parmelee,
their Attys.

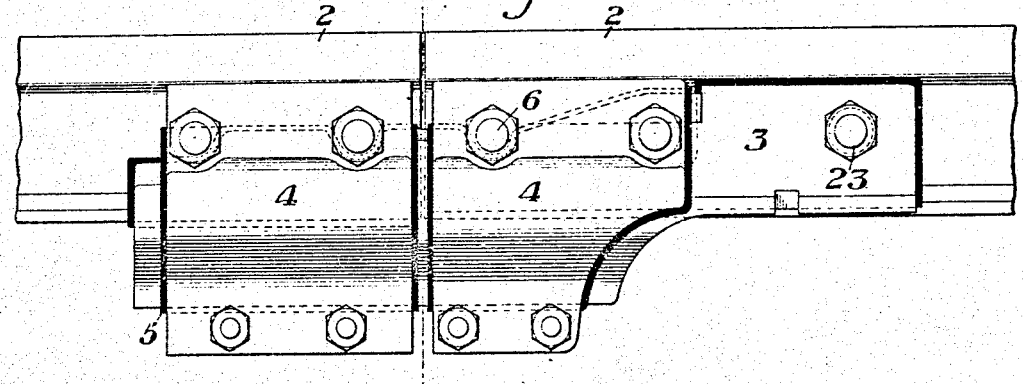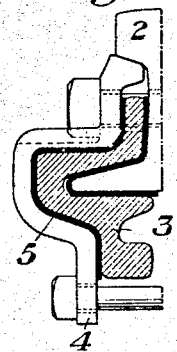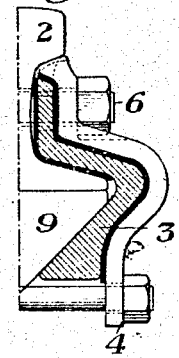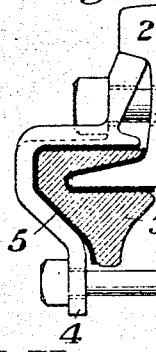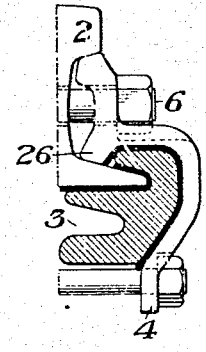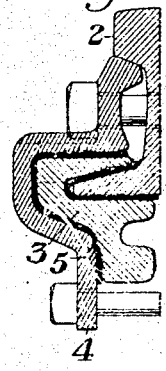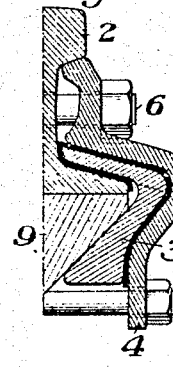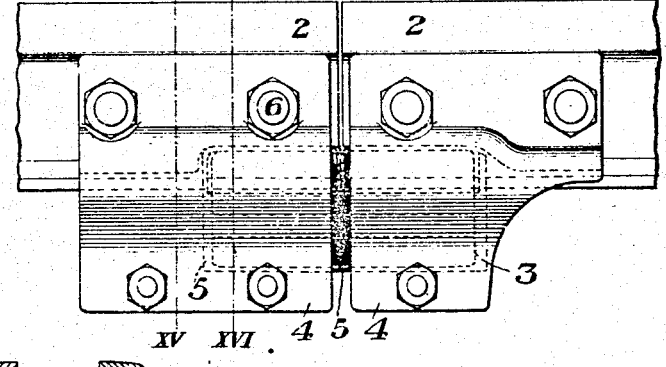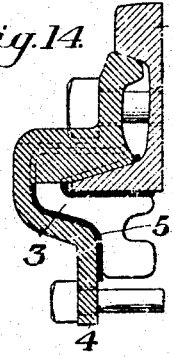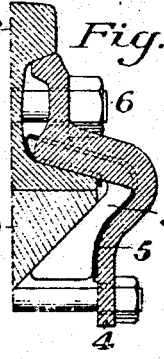

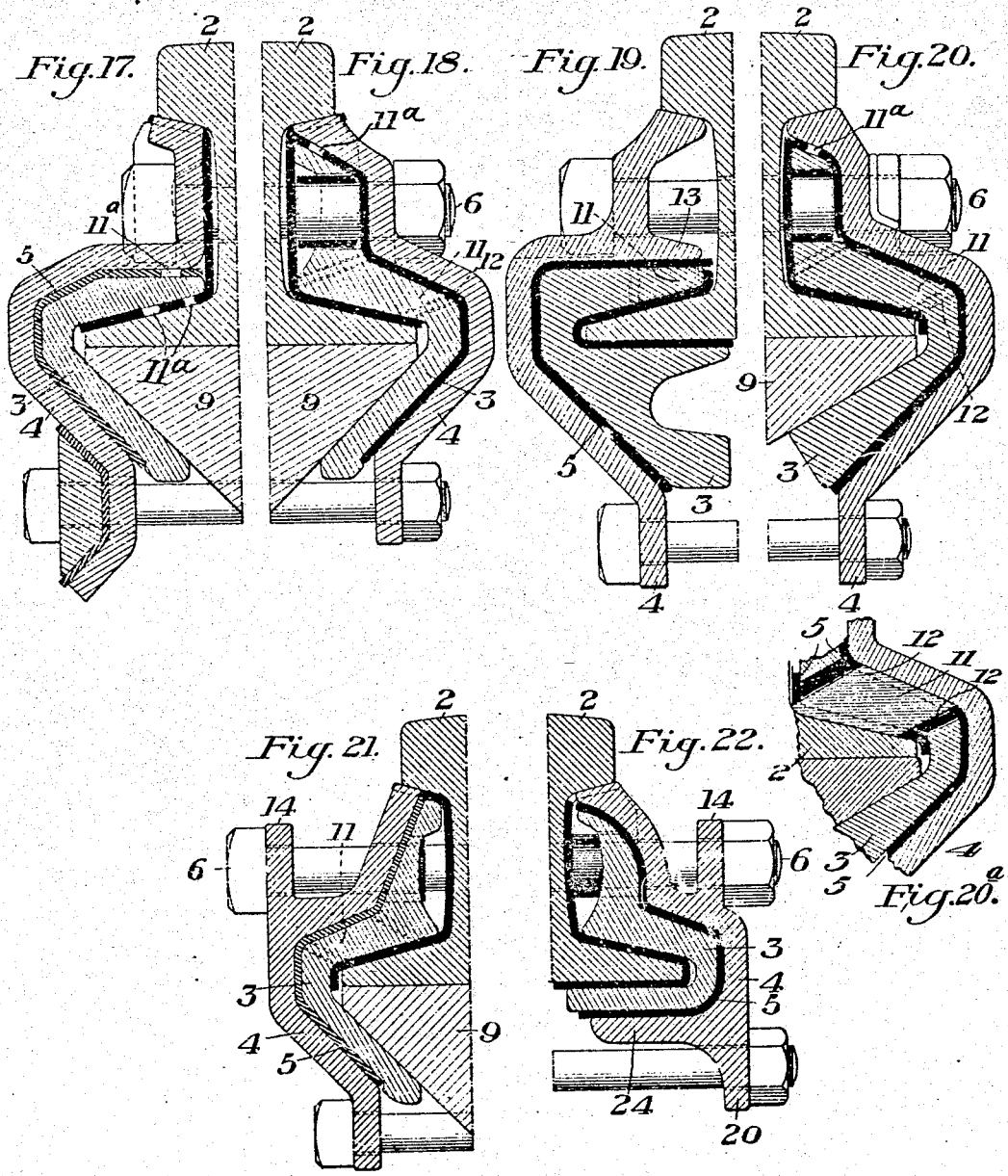

W. P. & S. G. THOMSON.
RAIL JOINT.
APPLICATION FILED OCT. 4, 1907.
969,124.
Patented Aug. 30, 1910.
6 SHEETS—SHEET 4.
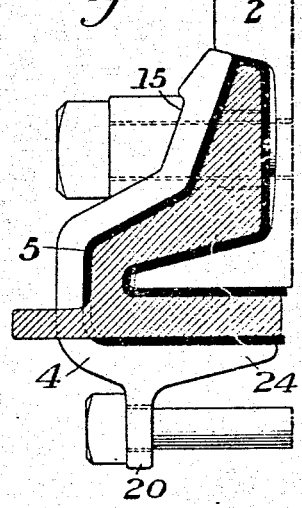
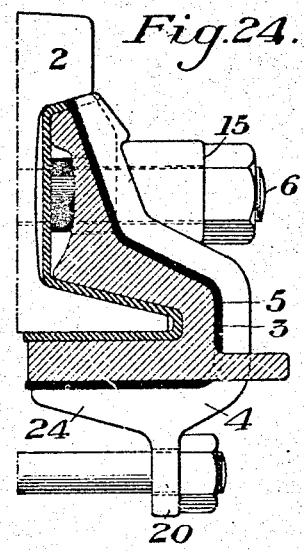
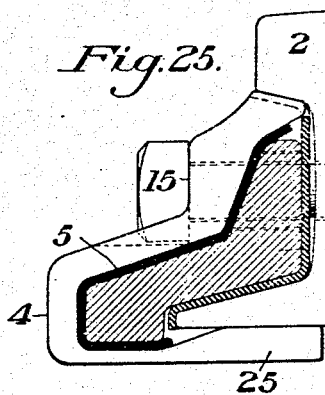
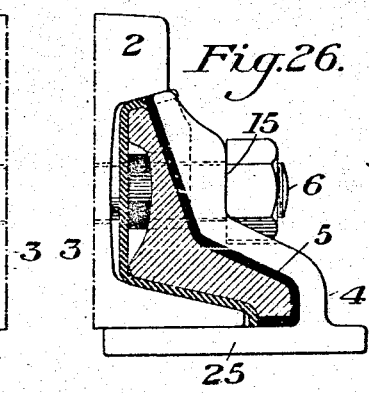

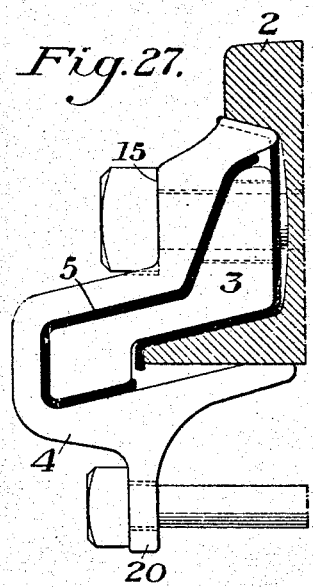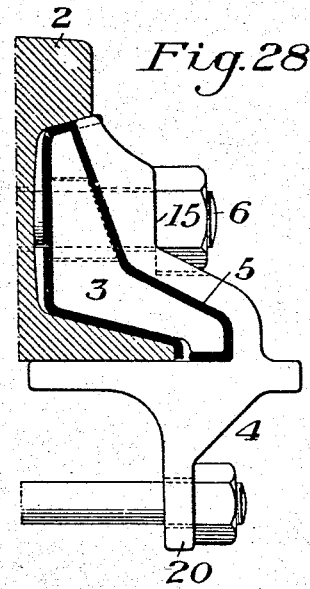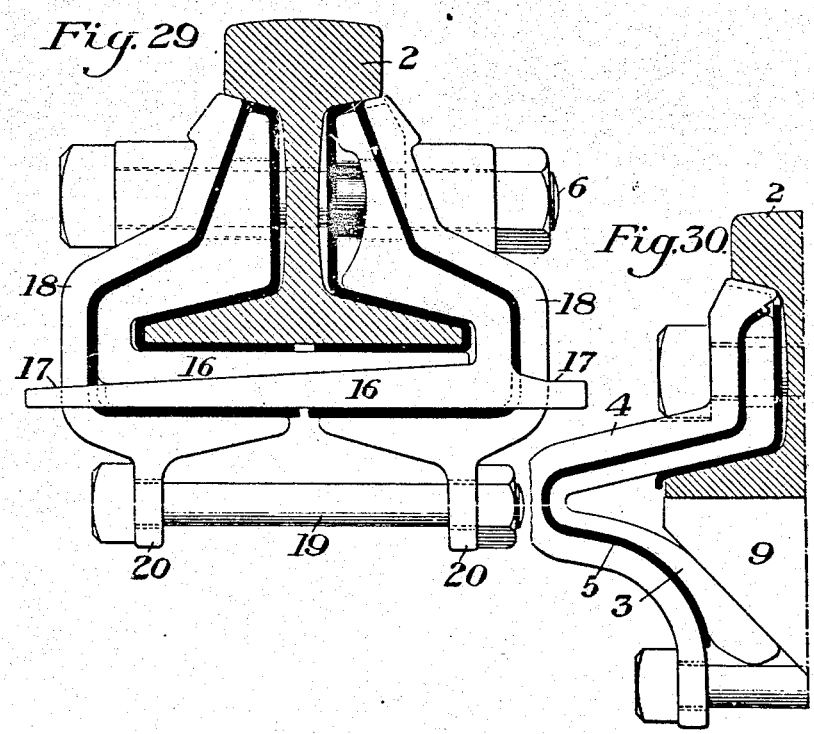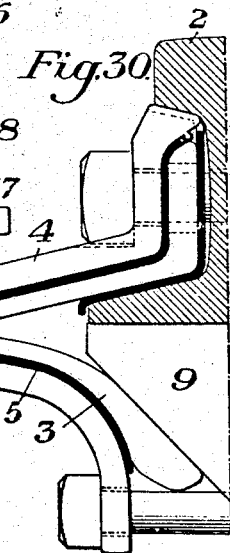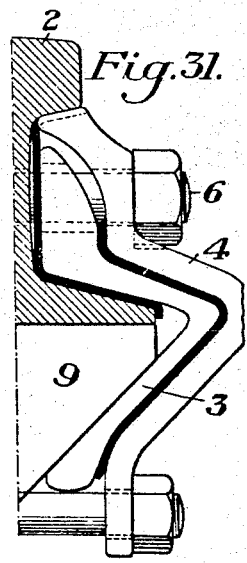

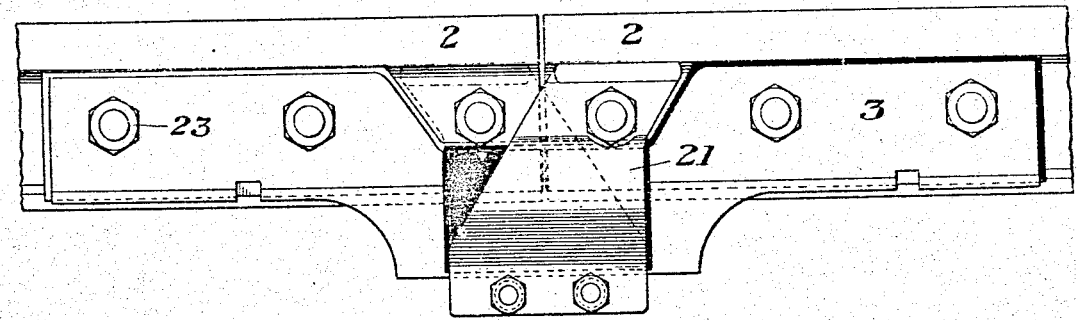
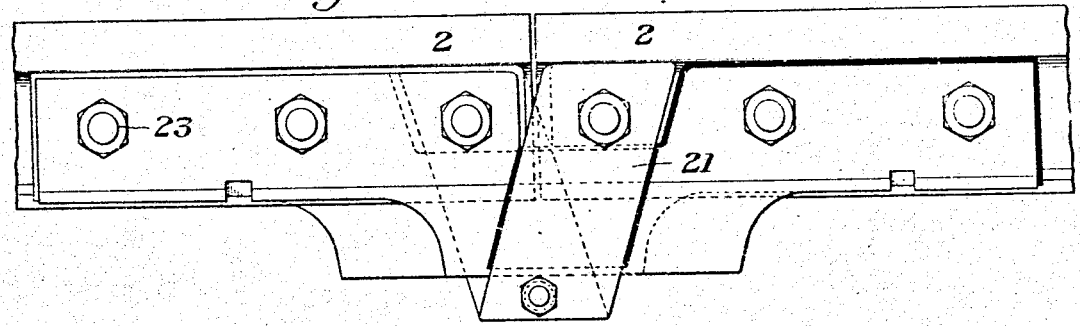
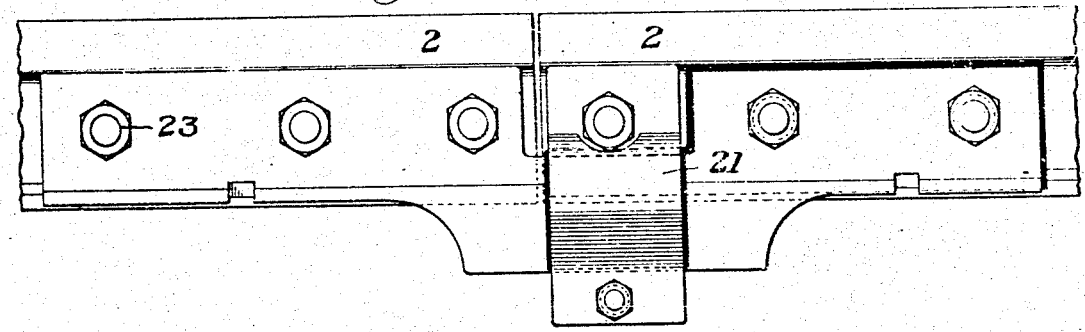

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

969,124.  Specification of Letters Patent. Patented Aug. 30, 1910.

Application filed October 4, 1907. Serial No. 395,897.

*To all whom it may concern:*

Be it known that we, WILLIAM P. THOMSON and SAMUEL G. THOMSON, both of Philadelphia, in the county of Philadelphia, Pennsylvania, have invented a new and useful Improvement in Rail-Joints, of which the following is a full, clear, and exact description, reference being had to the accompanying drawings, forming part of this specification, in which—

Figures 1, 2, 3, 4, 7, and 8 are side elevations of different forms of rail joints embodying our invention; Figs. 5, 6, 9, 10, 11, 12, 13, 14, 15, 16, 17, 18, 19, 20, 21, 22, 23, 24, 25, and 26, 27, 28, 29, 30 and 31 are sectional elevations showing different forms of joints embodying the invention, Figs. 15 and 16 being sections on the lines XV—XV and XVI—XVI of Fig. 8; Figs. 32, 33 and 34 are side elevations showing other modifications of the joint. Fig. 20ᵃ is a detail sectional view showing the arrangement of one of the spacers.

Our invention has relation to rail joints, and is designed to provide a joint which is very stiff with reference to the rails, but which has flexible parts with broad faces adapted to support intervening insulation and wearing plates.

The broadly novel feature of our invention consists in a joint having two or more sets of bars, at least one set of bars extending continuously across the joint, and the bars of another set each connected to but one of the rails.

For the purpose of reducing the number of illustrations, we have shown insulating and wearing liners in all the drawings, but these liners may be omitted between some of the parts, or altogether, according to the particular character of the joint which it is desired to obtain. When all liners are omitted, or when they are made of metal, or other non-insulating material, the joint is adapted to be used in ordinary service as a solid rail joint. When insulating material is used between the parts, the joint becomes well adapted for insulating purposes in track circuits. Our joint is in fact specially adapted for use as an insulating joint, as it permits of the provision of extra broad bearing surfaces, so arranged that the yielding and springing of the parts will act as a protection for the intervening insulation. Our invention includes a non-insulating plate or bar which can be used throughout the joint, interposed between the bars (Figs. 1, 4, 17 and 21) and also, if desirable, between the bars and the rails (Figs. 24, 25, and 26). This plate or bar can be made of the same thickness as insulating material, and used interchangeably in an insulated joint between such parts as do not need to be insulated. The advantage of its use in an insulated joint is, that the bars can be made of the same section throughout, without offsetting for insulating material, with the further advantage that the insulating and non-insulating plates can be interchanged to prolong their life and at the same time maintain the insulation of the joint and keep the parts tight. This non-insulating or metallic liner is preferably, though not necessarily, made of softer steel, than that of the rails and bars, so as to act also as a wear plate, to relieve the rails and bars of abrasion.

Our invention also includes the use of two kinds of spacing members when desired. These spacing members are interposed between adjacent bars, or between the bars and the rails; one kind are metallic for the purpose of forming a rigid metallic bearing between an outer bar and the rail and thus bringing into action additional insulating bearing faces, while the other kind are insulating spacing members for resisting the forces between adjacent metal faces, thus also protecting the intervening insulation from being crushed, either by the pinching action of the bars in service, or by undue tightening of the bolts. These latter may be made of any hard or rigid insulating material, and may be made separate from, or may be embedded into the insulating fiber plates. To still further increase the insulating bearing members of the joint, we may use one or more tie bars or plates for the outer bars of the joint, for the purpose of making such bars act together. These tie bars are insulated from at least one of the outside bars or plates, and may be used either above or below the rail base, or at both places. These bars may be wide enough to envelop any desired portion of the outside bars, and may be provided with bolt seats or through-bolts both above and below the rail bases, or separate bars may be used above and below the base of the rail.

Our invention is susceptible of various modifications, a number of which have been illustrated in the drawings, which will now be described.

In these drawings, the numeral 2 wherever seen, designates the joint rails, 3 the inner splice bars, 4 the outer joint bars, 5 the insulation, and 6 the joint bolts.

In the joint shown in Fig. 1, the inner bars 3 are insulated from one or both of the rails, and are cut away at their upper portions adjacent to the ends of the rails 2, as indicated at 7, to receive the outer bars 4, which bear against the under sides of the rail heads at their upper edges, and are connected by bolts both above and below the rail base. In this form, the insulation 5 is placed between each of the bars 4 and the inner splice bar, and the splice bar is also insulated from both rails.

In the form shown in Fig. 2, one of the outer bars 4 is shown as a short bar, which terminates at the base flange of the rail; no insulating material is used between it and the splice bar and the splice bar makes metallic contact with the rail through an intervening metallic plate, which is employed so that the section of the bar may be uniform opposite both rails. In both forms 1 and 2, 23 are splice bar bolts extending through the splice bars and the rails.

Fig. 3 shows a side elevation, and Figs. 5 and 6 are cross-sections of a joint illustrating the use of the tie bars 8, which connect the outer bars 4 both above and below the base of the rails. These tie bars may be insulated from one or both of the outer plates, and carry the gripping surfaces for the bolts. In the construction shown in these figures, the inner splice bars are not bolted to the rails, but have upper flanges fitting the upper surfaces of the base flanges of the rails and terminating short of the upper bolts. They also have lower members which terminate above the lower bolts, and may or may not support the wooden blocks 9. In this case the inner splice bars are about the same length as the outer clamping bars.

In Fig. 4 we show a form similar to Fig. 1, except that the upper cut-out portion of the inner splice bar is deeper and the depending flange is made longer in order to provide sufficient metal to furnish stiffness for the bar. Instead of being insulated from both rails, the inside splice bar contacts directly with one rail. The deep cutting or recessing of the splice bar allows the outer clamping plates or bars to be extended in horizontally above the level of the rail base flanges, thus providing vertical bolting faces, which allow shorter bolts as shown in Figs. 5 and 6. In this case, the insulation extends horizontally between the horizontal member of the clamping plate and the splice bar. A non-insulating spacing plate is used between the bars on one side of the joint instead of insulation, in order to maintain the same section of the bars throughout.

In Fig. 7 the right-hand portion of the splice bar extends below the head of the rail so that two of the bolts extend through this inner splice bar 3. Thence, the upper edge of the splice bar is inclined downwardly as indicated by the dotted lines, to a lower level; and is notched to clear the bolts 6, it being extended upwardly between the bolts to give greater stiffness. In this form the left-hand portion of the joint is similar to that of Fig. 3, except that the bar 8 is not used, the plate 4 extending straight up to the head of the rail as shown in Fig. 9. The right-hand portion of the joint is the same as the left-hand portion, except for the inclining of the upper edge of the splice bar, and the cutting away on curved lines of the depending flange and of the plate 4. This cutting away allows a closer spacing of the ties, and may be used on either one or both sides of the joint.

Figs. 9, 10, 11, 12, 13, 14, 15, and 16, show forms in which the inner bars are shown as of various forms, either extending inwardly underneath the base flange of the rail to form a chair or support therefor, or projecting downwardly out of contact with the rail base to support a block or other supporting member. Thus, Figs. 9, 11, 12 and 13 show forms in which the inner bars are extended horizontally inwardly beneath the base flange to form the rail chair or seat; while Figs. 10, 15, and 16 show the flanges projecting downwardly and inwardly out of contact with the rail base to support the block or supporting member 9. In Fig. 12 the plate or bar 4 has an intermediate downward extension 26 which contacts with the rail base and performs the function of the spacing pieces 11 which are shown in Figs. 18, 19, 20 and 21.

Fig. 8 shows another construction, in which the outer bars 4 are recessed to receive comparatively short, small inner splice bars, which extend across the joint as shown, and are pocketed within the outer bars.

Figs. 17, 18, 19, 20, 21, 22, 23, 24, 25, 26, 27 and 28 show various forms of the inner and outer bars, which will be clearly understood by reference to the drawings without detailed description, it being understood that in each case the inner bars extend continuously across the joint between the two rails while the outer bars are separate bars, which may be of the forms illustrated in either of Figs. 1, 2, 3, 4, 7 and 8. Figs. 17, 18, 19 and 20 are sectional views showing forms of joints with side elevations similar to Figs. 1, 2 and 4. Figs. 17 and 19 show deep-notched inside bars, as in Fig. 4, while Figs. 18 and 20 show the inside bar extending nearly to the head of the rail in the notched portion, as in Figs. 1 and 2. Figs.

17, 18, 19, 20 and 21 also illustrate the use of spacing members, the reference characters 11, 11ª wherever seen designating a member of this character. The spacing members 11 act as metallic bearings between the outer bars and the rail to bring the extra insulation surfaces into action and thereby increase the insulating area by causing the outer plates to move with the rails in either direction up or down as the load passes from one rail to another, as would be the case with the outer bar as shown in Fig. 12. Fig. 17 shows the insulating spacing members 11ª interposed between the inner bar and the upper surface of the rail base. Fig. 18 shows one of these members 11ª interposed between the inner and outer bars, and also a second and larger metallic member 11 extending through the inner bar and interposed between the outer bar and the upper surface of the rail base, with surrounding insulation 12. Fig. 19 shows a similar metallic spacing member 11 interposed between the flange 13 of the outer bar and the upper surface of the base flange of the rail; Fig. 20 shows spacing members similar to those of Fig. 18, and Fig. 21 shows a large metallic spacing member 11 similar to that of Figs. 18 and 20.

It will be noted that the outer bars are shown as provided with gripping surfaces for the bolts of various characters, either by forming separate flanges 14 thereon, as in Figs. 21 and 22, or by milling out a recess as in Figs. 17, 18, 19 and 20, the last having an insulated washer; or by forming specially shaped faces 15 therefor, as in Figs. 23, 24, 25, 26, 27 and 28.

In Figs. 22, 23, and 24 we show the outer bar as having a depending vertical bolting flange 20, to receive through-bolts which extend across beneath the joint, and these outer members are also provided with inwardly extending horizontal flanges 24 to support the inside chair bar for the joint.

In Figs. 25 and 26 ordinary angle bars are employed without depending flanges, and the outer bars are extended inwardly and horizontally, as shown at 25, to form metallic seats, which contact directly with the base of the rail. In this case there is a metallic seat between the outer bars and the head of the rail and the base of the rail, no insulation being required.

In Figs. 27 and 28, the construction is somewhat similar to that of Figs. 25 and 26, except that the depending flanges 20 are employed to receive the through-bolts beneath the joint.

Fig. 29 shows a form of joint in which the inner bars are provided with interfitting base portions 16, upon which the rail base is seated, with intervening insulation, and which are slotted as indicated at 17 to receive a vertical portion 18 of the outer bars. The lower portions of the outer bars are carried inwardly underneath the rail base, and the interfitted base portion 16 of the inner bars, and are connected by bolts 19 seated in the depending flanges 20 of the outer bars.

Figs. 30 and 31 show other forms of the joint, in which both the inner and outer bars are carried around the rail base and extend below the same, in such a way as to provide a broader insulating bearing surface and give greater flexibility.

In all the forms heretofore referred to, at least two outer bars are employed at each side of the rails. In the modification shown in Figs. 32 and 33, a single outer bar 21 is employed at each side of the rails, being bolted through to a similar bar at the opposite side, the bars at the two sides having heads bearing against different rails.

Fig. 34 shows a form similar to forms 32 and 33, except that the outer bar 21 is not inclined and does not extend across the joint. In this case, both of the outer bars are beneath the same rail head, and the depending flange of the splice bar does not extend equally on both sides of the joint, but is placed directly under the notched portion which is almost wholly at one side of the joint. In Fig. 34 the inner splice bar has direct contact with the head of the rail in the left-hand portion, while in the right-hand portion it is insulated therefrom, the inner face of this portion of the bar being offset or recessed to receive the insulation. In Figs. 32 and 33, a non-insulating plate is employed between the left-hand portion of the splice bar and the rail, this being interchangeable with the insulation to make the splice bar similar on both sides.

The advantages of our invention resulting from the use of the inner and outer bars of the character described, will be obvious to those skilled in the art. The strains in the joint are transmitted from narrow unyielding surfaces to broad flexible faces, and each rail has a separate bar or plate which can be tightened against it to take up wear. Effective insulation is provided for, together with protection against the cutting of the insulation, while the joint as a whole is an exceedingly stiff and secure one, which is well adapted to modern conditions of traffic.

While we have shown our invention as applied to tee rails only, it will be obvious that it is applicable to rails of all sections.

The various bars may be of any suitable design and length, and may contact with each other and with the rail on any number of faces. The inside or outside bars may have the parts below the base of the rail in the form of a seat for the joint on the ties and for the rail in the joint; or they may extend downwardly and inwardly between the ties to form an intermediate seat for the rail, or the depending portions may support a block below the rail base, as shown in a number of the figures, or they may depend freely downward without intervening parts. They may be of various lengths relative to each other, and may terminate at the ties, or extend over the ties; some of them may be comparatively short and used adjacent to the meeting ends of the rails only. The inside splice bars may be bolted to the rails, or they may be entirely free of bolts passing through them and may be held or clamped to the rail entirely by the outside bars and bolts. The inside bar may be recessed by forging or cutting to receive the outside bar, or the outside bar may be similarly recessed to receive the inside bar. The joints may or may not have bolts holding the parts together below the rail base.

What we claim is:—

1. A rail joint having an inner bar, and an outer bar fitted over the inner bar and having a rail-bearing surface under the head of one rail only and having a bolting portion below the rail base, substantially as described.

2. A rail joint having inner and outer bars, the inner bars extending across the joint adjacent to both rails, and the outer bars fitted over the inner bars, at least one of said outer bars having a bolting portion below the rail base and a rail bearing under the head of one rail only, substantially as described.

3. A rail joint having inner and outer bars, the inner bars being recessed at their top adjacent to their middle only and extending across the joint and the outer bars fitted over the inner bars and each having a rail bearing on only one of the rails, substantially as described.

4. A rail joint having inner bars extending across the joint and secured to both rails but insulated from at least one rail, and outer bars contacting each with only one of the rails under its head and insulated from the inner bars.

5. A rail joint having inner bars extending across the joint and insulated from at least one rail, and outer bars insulated from said inner bars and each bearing against one of the rails and bolted thereto.

6. A rail joint having two sets of bars, one set being fitted over the other, the inner bar of each set being continuous across the joint, and the outer bars each contacting under the head of only one of the rails and having a bolting flange below the rail base, substantially as described.

7. A rail joint having two sets of bars, one set being fitted over and insulated from the other, the inner bar of each set being continuous across the joint and insulated from at least one rail, and the outer bars of the other set contacting each with only one of the rails under the rail head.

8. A rail joint having two sets of bars, one set being fitted over the other, the bars of the inner set being continuous across the joint and insulated from at least one rail, and at least one of the bars of the outer set extending inwardly over the rail foot and contacting with only one of the rails and insulated from the inner bars.

9. A rail joint having an inner bar extending across the joint, and insulated from at least one rail, and outer bars, each of which has a metallic bearing against the head of one of the rails and at least one of which is insulated from the inner bar.

10. A rail joint having an inner bar extending across the joint, and an outer bar fitting over the inner bar and having a metallic bearing against one rail only above the rail base, said outer bar having a bolting flange below the base of the rail, substantially as described.

11. In a rail joint, the combination of an inside bar, a pair of outside bars or plates fitting under the rail head and clamping said inside bar to the rail, and bolts passing through said outside bar above and below the rail base.

12. In a rail joint, the combination of an inside bar extending across the joint and insulated from at least one rail, and a pair of outside bars or plates clamping said inside bar to the respective rails, at least one of which outside bars is insulated from the inside bar and contacts with the rail head.

13. A rail joint having an inner bar extending across the joint and insulated from at least one rail, separated outside bars on the same side of the rail, each having a metallic contact with one only of the rails and at least one of them insulated from said inside bar, and a tie bar connecting the outside bars and insulated from at least one of them.

14. A rail joint having inner and outer bars, one of said bars being recessed to receive the other, the inner bars being insulated from at least one rail, and the outer bars having metallic contact with the rails but insulated from each other.

15. In a rail joint, the combination of two outer bars or plates arranged on the same side of the rail, each making metallic contact with one rail only, and an inside bar standing free from the rail web and means for insulating one of said bars from the other and from said inside bar, substantially as described.

16. In a rail joint, an inner splice bar extending across the joint and having a free space between its upper edge and the under side of the rail head, and an outer bar having a bolting flange below the rail base fitting over the inner bar and having metallic contact with the head of one rail only, substantially as described.

17. In a rail joint, a splice bar having a metallic contact with one rail, a second bar at the same side of the rails extending across the joint and having electrical connection only with the other rail, said bars being separated from each other by intervening insulation.

18. In a rail joint, a pair of coacting plates or bars arranged at the same side of the rails, one of said bars having metallic contact with one rail under its head only, and the other of said bars extending across the joint and having electrical connection only with the other rail.

19. A rail joint having a pair of coacting joint plates or bars at the same side of the rails, each making metallic contact with one rail only, one of said bars being secured to one rail and fitting under its head and having a bolting portion below the rail base, and the other bar secured to both rails, substantially as described.

20. In a rail joint, an inner bar or plate extending across the joint and having a recess at its upper edge adjacent to its middle only, and an outer bar or plate adapted to extend through a portion of said recess and to make metallic contact with the head of one rail only, substantially as described.

21. In a rail joint, inner and outer splice bars, and a rigid spacer interposed between the said outer bar and the rail and insulated from the inner bar, substantially as described.

22. A rail joint having three bars or plates arranged on one side thereof, at least two of said bars having bolting faces, and one bar contacting under the head of one rail only and having a bolting flange below the rail base, substantially as described.

23. A rail joint having on one side of the rails an inside bar or plate recessed at its middle only, and two outside bars or plates, each of the outside bars contacting under the head of one rail only, substantially as described.

24. In a rail joint, the combination of an outside bar or plate bearing under the rail head and a longer inside bar standing free from the rail web, and means for insulating one from the other, substantially as described.

25. In a rail joint, the combination of two outside bars or plates bearing under the rail head and one inside bar standing free from the rail web arranged on one side of a rail joint, with means for insulating one from another, substantially as described.

26. A rail joint having an inner bar, two outer bars on the same side of the rail fitting over the inner bar and making metallic contact under the head of the rail, a tie bar connecting said outer bars, and means for insulating said parts from each other.

27. In a rail joint, an inner bar and an outer bar and a rigid spacer extending through the inner bar and interposed between the outer bar and a face of the rail, substantially as described.

In testimony whereof, we have hereunto set our hands.

WILLIAM P. THOMSON.
SAMUEL G. THOMSON.

Witnesses:
S. E. PATTERSON,
M. LIDDLE.